US012594898B2

(12) United States Patent (10) Patent No.: US 12,594,898 B2
Hayakawa et al. (45) Date of Patent: Apr. 7, 2026

(54) VEHICLE STRUCTURE WITH BATTERY

(71) Applicant: HONDA MOTOR CO., LTD., Tokyo (JP)

(72) Inventors: Hirotaka Hayakawa, Tokyo (JP); Tetsuya Sugizaki, Tokyo (JP); Ryo Shinoda, Tokyo (JP); Wataru Yamamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 455 days.

(21) Appl. No.: 18/126,510

(22) Filed: Mar. 27, 2023

(65) Prior Publication Data

US 2023/0311793 A1 Oct. 5, 2023

(30) Foreign Application Priority Data

Mar. 31, 2022 (JP) ................................. 2022-059745

(51) Int. Cl.
B60R 16/04 (2006.01)
B60K 1/04 (2019.01)
B62D 21/15 (2006.01)

(52) U.S. Cl.
CPC ................ B60R 16/04 (2013.01); B60K 1/04 (2013.01); B62D 21/157 (2013.01); B60K 2001/0422 (2013.01); B60K 2001/0433 (2013.01)

(58) Field of Classification Search
CPC ................ B60K 2001/0422; B60K 2001/0433
See application file for complete search history.

(56) References Cited

U.S. PATENT DOCUMENTS

| | | | | |
|---|---|---|---|---|
| 9,956,861 B2 * | 5/2018 | Nomura | ................ | B62D 21/07 |
| 10,486,515 B2 * | 11/2019 | Saeki | .................... | B60N 2/005 |
| 11,148,728 B2 * | 10/2021 | Saeki | ...................... | B60K 1/04 |
| 2016/0257187 A1 | 9/2016 | Nakajima | | |
| 2016/0301120 A1 * | 10/2016 | Katsuno | ............. | H01M 10/625 |

(Continued)

FOREIGN PATENT DOCUMENTS

| | | |
|---|---|---|
| CN | 213007574 | 4/2021 |
| EP | 3798034 | 3/2021 |
| JP | 2013-256265 | 12/2013 |

(Continued)

OTHER PUBLICATIONS

Chinese Office Action for Chinese Patent Application No. 202310254502.6 mailed Sep. 30, 2025.

(Continued)

*Primary Examiner* — Joseph D. Pape
(74) *Attorney, Agent, or Firm* — Amin, Turocy & Watson, LLP

(57) ABSTRACT

A vehicle structure with a battery includes a battery placement portion, a front cross member, a rear cross member, and left and right rear side frames. The front cross member is disposed at a vehicle forward position of the battery placement portion. The rear cross member is disposed at a vehicle rearward position of the battery placement portion. The left and right rear side frames are disposed on left and right outer sides of the battery placement portion. The battery placement portion includes a battery fixation portion that is provided on an outer side in a vehicle width direction and is connected to a battery.

8 Claims, 6 Drawing Sheets

(56) References Cited

U.S. PATENT DOCUMENTS

| | | |
|---|---|---|
| 2018/0170206 A1 | 6/2018 | Kim et al. |
| 2021/0101490 A1 | 4/2021 | Yang et al. |

FOREIGN PATENT DOCUMENTS

| | | |
|---|---|---|
| JP | 2016-199105 | 12/2016 |
| JP | 6631472 | 1/2020 |
| JP | 2021-054216 | 4/2021 |
| JP | 2021-088264 | 6/2021 |

OTHER PUBLICATIONS

Japanese Office Action for Japanese Patent Application No. 2022-059745 mailed Sep. 30, 2025.

* cited by examiner

FIG. 4

VEHICLE STRUCTURE WITH BATTERY

CROSS-REFERENCE TO RELATED APPLICATION

Priority is claimed on Japanese Patent Application No. 2022-059745, filed on Mar. 31, 2022, the contents of which are incorporated herein by reference.

BACKGROUND

Field of the Invention

The present invention relates to a vehicle structure with a battery.

Background

As vehicle structures with a battery, vehicle structures with a battery in which a battery main body and electrical components for a power supply circuit control unit (IPU) are disposed below a rear seat are known. As vehicle structures with a battery, vehicle structures with a battery in which a front cross member is provided at a vehicle forward position of the battery main body and the electrical components and a rear cross member is provided at a vehicle rearward position are known. The battery main body and the electrical components may be referred to as a "battery" in some cases.

Here, the front cross member and the rear cross member are highly rigid members that form part of a vehicle body skeleton. Thus, it is possible to protect the battery using the front cross member and the rear cross member by fastening and fixing the battery to the front cross member and the rear cross member (refer to, for example, Japanese Patent No. 6631472).

SUMMARY

Here, in the vehicle structure with a battery in Japanese Patent No. 6631472, the battery is fastened and fixed to the front cross member and the rear cross member. Thus, it is conceivable that, for example, when an impact load is input to the front cross member and the rear cross member due to a side collision, the input impact load is input from the front cross member or the rear cross member to the battery.

Also, a bottom panel is provided below the battery, for example, to protect the battery. Since the bottom panel is disposed below the battery, the bottom panel is formed in a relatively large shape (specifically, a shape in which a length thereof in a vehicle width direction is long). For this reason, it is conceivable that, for example, when a vehicle is traveling, the bottom panel may vibrate and generate abnormal noise.

As a countermeasure for this, it is conceivable that the rigidity of a battery fixation portion of a bottom panel or the like be increased.

However, it is conceivable that, when the rigidity of the battery fixation portion is increased, an amount of impact load input to the battery fixation portion may be increased at the time of side collision. In addition, increasing the rigidity of the battery fixation portion is likely to increase a weight thereof.

In addition, in the vehicle structure with a battery in Japanese Patent No 6631472, the battery is fastened and fixed only to the front cross member and the rear cross member. According to this constitution, it is conceivable that a relatively large load may be input to the battery due to side collisions, torsion which occurs in a vehicle body at the time of steering, and road noise (for example, vibration due to friction between the tires and the road surface).

An object of an aspect of the present invention is to provide a vehicle structure with a battery in which an impact load input due to a side collision can be prevented from being input to a battery and occurrence of abnormal noise due to vibration can be prevented.

A vehicle structure with a battery according to a first aspect of the present invention includes: a battery placement portion on which a battery is disposed and which is located below a seat; a front cross member disposed at a vehicle forward position of the battery placement portion; a rear cross member disposed at a vehicle rearward position of the battery placement portion; and a vehicle body side frame extending in a vehicle forward/rearward direction on an outer side in a vehicle width direction of the battery placement portion, wherein the battery placement portion includes a battery fixation portion that is provided on the outer side in the vehicle width direction and is connected to the battery.

With a constitution realized in this way, the battery fixation portion can be disposed in a region surrounded by the front cross member, the rear cross member, and the vehicle body side frame. Thus, it is possible to prevent an impact load input due to side collision from being input to the battery.

In addition, the battery is connected (fixed) to the battery fixation portion (that is, battery placement portion). Thus, the battery can act as a mass for the battery placement portion. Therefore, it is possible to prevent the occurrence of abnormal noise due to vibration by preventing the vibration of the battery placement portion using the battery.

In this way, the battery fixation portion is disposed in the region surrounded by the front cross member, the rear cross member, and the vehicle body side frame and the battery is connected to the battery fixation portion. Thus, it is possible to prevent an impact load from being input to the battery without increasing a weight of the vehicle, and it is possible to prevent the occurrence of abnormal noise due to vibration.

In a second aspect, the battery placement portion may include a concave portion which is surrounded by the front cross member, the rear cross member, and the vehicle body side frame and is recessed downward so that the battery is able to be accommodated, and the battery fixation portion may be disposed in the concave portion.

With a constitution realized in this way, the battery can be accommodated in the concave portion via the battery fixation portion. Thus, it is possible to prevent an impact load input due to side collision from being input to the battery.

In addition, the battery is fixed to the concave portion via the battery fixation portion. Thus, the battery can act as a mass for the concave portion (that is, battery placement portion). Therefore, it is possible to prevent the occurrence of abnormal noise due to vibration by preventing the vibration of the battery placement portion using the battery In a third aspect, the battery placement portion may have a hollow cross section formed of the battery fixation portion and the concave portion, and a reinforcement patch disposed on a vehicle room outside of the concave portion so that the reinforcement patch and the battery fixation portion overlap in a vehicle top view may be provided.

With a constitution realized in this way, it is possible to increase the rigidity of the battery fixation portion by forming the hollow cross section using the battery fixation portion and the concave portion. In addition, the reinforcement patch is disposed on the vehicle room outside of the concave portion so that the reinforcement patch and the battery fixation portion overlap. Thus, it is possible to further increase the rigidity of the battery fixation portion. Therefore, it is possible to firmly support the battery using the battery fixation portion.

In addition, by increasing the rigidity of the battery fixation portion, it is possible to prevent vibration of the battery placement portion, and it is possible to prevent the occurrence of abnormal noise due to the vibration.

In a fourth aspect, the concave portion may include: a bottom portion disposed below the battery, and a sloped portion which slopes upward from the bottom portion toward an outside in the vehicle width direction, and the battery fixation portion and the reinforcement patch may be connected to the concave portion to straddle an intersection of the bottom portion and the sloped portion.

With a constitution realized in this way, it is possible to increase the rigidity of the battery fixation portion. Thus, it is possible to firmly support the battery using the battery fixation portion.

In addition, by increasing the rigidity of the battery fixation portion, it is possible to prevent vibration of the battery placement portion (concave portion), and it is possible to prevent the occurrence of abnormal noise due to the vibration.

In a fifth aspect, the sloped portion may include a convex portion protruding toward an inside of the concave portion, and the battery fixation portion and the reinforcement patch may be joined to the convex portion.

With a constitution realized in this way, it is possible to smoothly transfer a load of the battery input via the battery fixation portion to the sloped portion (that is, concave portion) via the convex portion, and it is possible to increase the rigidity of the battery fixation portion against the load input from the battery.

In addition, by increasing the rigidity of the battery fixation portion, it is possible to prevent vibration of the battery placement portion, and it is possible to prevent the occurrence of abnormal noise due to the vibration.

In a sixth aspect, the sloped portion may be disposed to be spaced inward in the vehicle width direction with respect to the vehicle body side frame.

With a constitution realized in this way, it is possible to secure a clearance (space) for the vehicle body side frame being deformed due to an impact load input due to side collision. Thus, it is possible to prevent the deformed vehicle body side frame from coming into contact with the battery fixation portion and the battery, and it is possible to prevent an impact load from being input from the vehicle body side frame to the battery.

In a seventh aspect, the vehicle body side frame may include an inner sloped portion which slopes inward in the vehicle width direction toward a vehicle rearward direction and is joined to an outer end portion on an outer side in the vehicle width direction of the rear cross member, and the battery fixation portion and the reinforcement patch may be disposed on a vehicle forward side with respect to the inner sloped portion and disposed on a further inward side in the vehicle width direction than the outer end portion of the rear cross member.

With a constitution realized in this way, it is possible to efficiently transfer an impact load input due to side collision to the rear cross member via the inner sloped portion of the vehicle body side frame. Thus, it is possible to prevent an impact load from being input to the battery and the battery fixation portion.

In an eighth aspect, the vehicle structure with a battery may include: a battery tray disposed between the battery and the bottom portion and connected to the battery fixation portion, wherein the battery may include a battery main body constituted of a battery cell, and an electrical component connected to the battery main body, and the battery tray may support the battery main body and the electrical component.

With a constitution realized in this way, for example, it is possible to prevent an impact load input due to side collision from being input to the battery main body and the electrical component via the vehicle body side frame, the front cross member, and the rear cross member.

In addition, it is possible to increase a load (weight) input to the battery fixation portion by supporting the battery main body and the electrical component using the battery tray. Thus, it is possible to prevent vibration of the battery placement portion, and it is possible to prevent the occurrence of abnormal noise due to the vibration.

In addition, the battery tray is connected to the battery fixation portion included in the battery placement portion. The battery fixation portion is disposed in the region surrounded by the front cross member, the rear cross member, and the vehicle body side frame. Thus, for example, it is possible to prevent the distortion of the battery tray due to the torsion occurring in the vehicle body at the time of side collision or steering or road noise (for example, vibration due to friction between a tire and a road surface). The battery main body and the electrical component are supported by the battery tray. Hereinafter, the vibration and the like due to the friction between the tire and the road surface may be referred to as "road noise" in some cases.

Thus, it is possible to prevent the load input to the battery main body and the electrical component (particularly, battery main body) due to the torsion or the road noise occurring in the vehicle body. Therefore, it is possible to reduce the load input to the bracket or the like that connects the battery tray to the battery main body, and it is possible to increase the connection rigidity between the battery tray and the battery main body.

In a ninth aspect, the battery main body may be disposed on one side in the vehicle width direction of the concave portion, the electrical component may be disposed on another side in the vehicle width direction of the concave portion, and the battery fixation portion may be disposed on one end portion in the vehicle width direction of the concave portion.

With a constitution realized in this way, the battery main body can be disposed close to the battery fixation portion. Thus, the battery main body having a greater weight than the electrical component can be efficiently supported by the battery fixation portion. Therefore, it is possible to increase the support rigidity of the battery fixation portion with respect to the battery.

In addition, it is possible to increase the role of mass for the battery placement portion using the battery main body by supporting the battery main body having a heavier weight using the battery fixation portion. Thus, it is possible to prevent vibration of the battery placement portion using the battery, and it is possible to prevent the occurrence of abnormal noise due to the vibration.

Moreover, it is possible to further preferably prevent the load input to the battery main body due to the torsion or the road noise occurring in the vehicle body by disposing the battery main body close to the battery fixation portion. Thus, it is possible to further reduce a load input to the bracket or the like that connects the battery tray to the battery main body.

According to an aspect of the present invention, it is possible to prevent an impact load input due to side collision from being input to the battery, and it is possible to prevent the occurrence of abnormal noise due to vibration.

BRIEF DESCRIPTION OF THE DRAWINGS

FIG. 4 is a cross-sectional view taken by cutting along line of FIG. 1.

DESCRIPTION OF EMBODIMENTS

Figure 1:
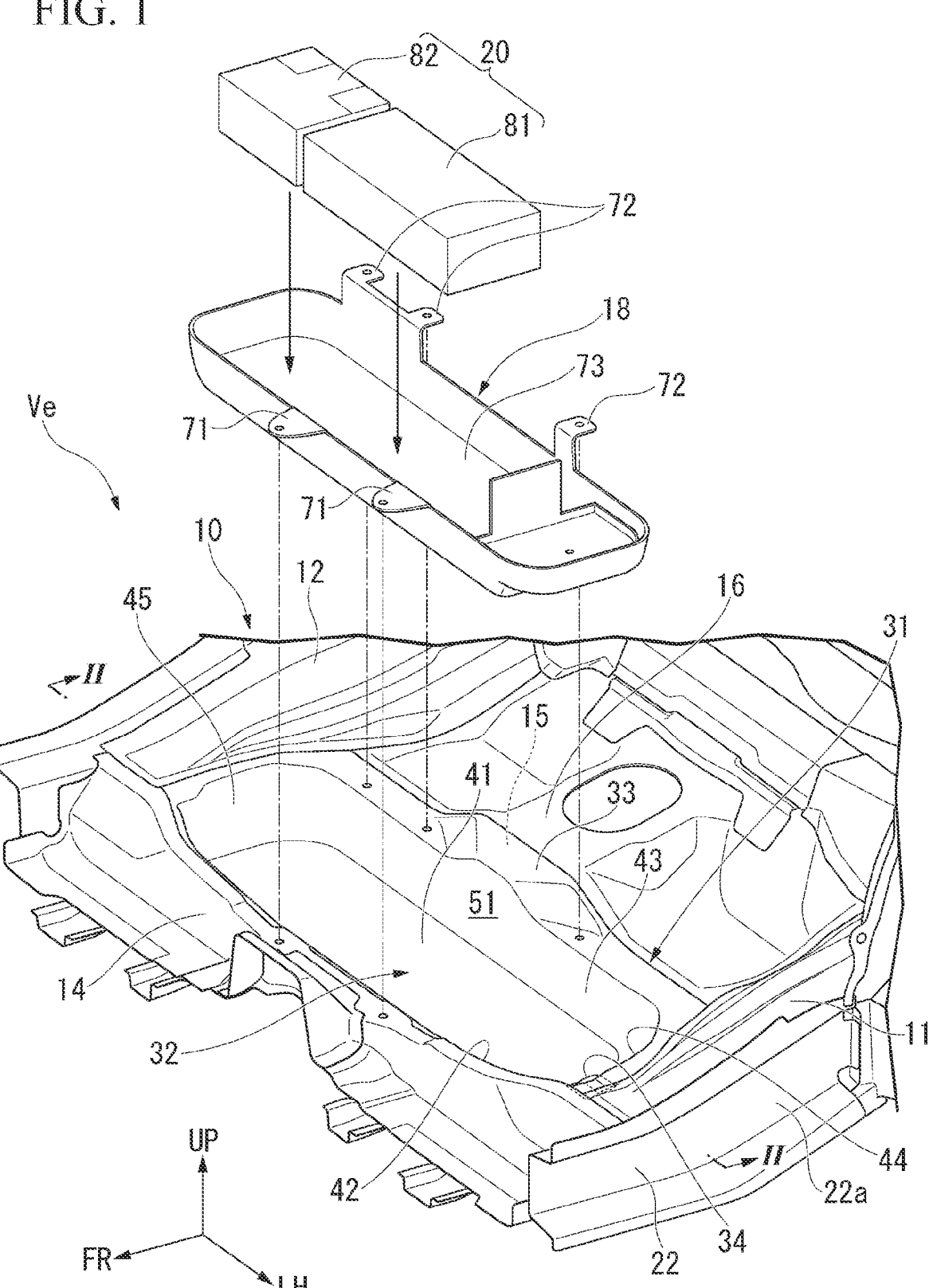
FIG. 1 is an exploded perspective view illustrating a vehicle structure with a battery in an embodiment of the present invention.

A vehicle structure with a battery will be described below on the basis of the drawings of an embodiment of the present invention. In the drawings, an arrow FR indicates a forward side of a vehicle, an arrow UP indicates an upward side of the vehicle, and an arrow LH indicates a left side of the vehicle.

<Vehicle Structure with Battery>

Figure 2:
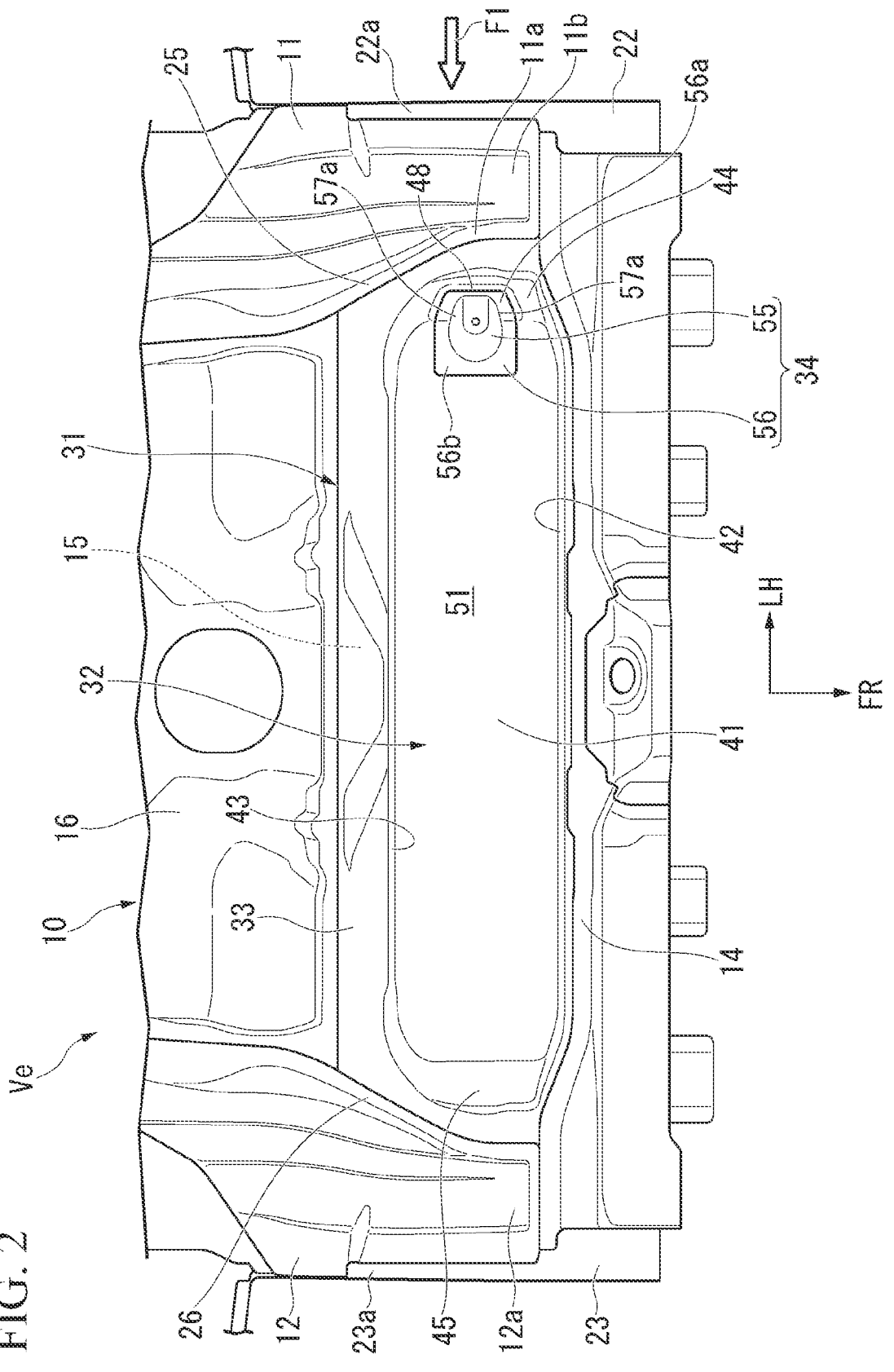
FIG. 2 is a plan view illustrating the vehicle structure with a battery in the embodiment of the present invention.
Figure 3:
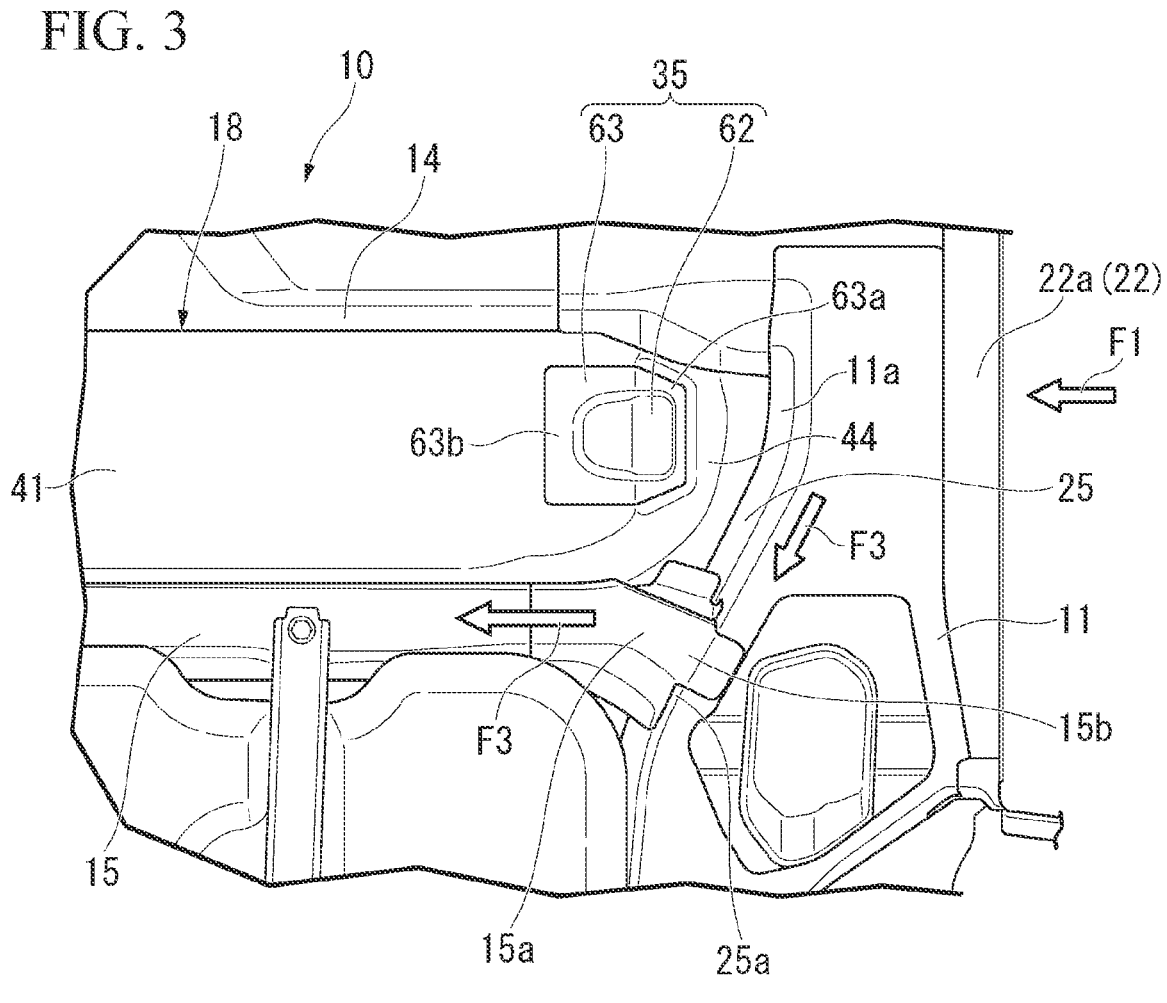
FIG. 3 is a bottom view illustrating a left side portion of the vehicle structure with a battery in the embodiment of the present invention.
Figure 3:

FIG. 1 is an exploded perspective view illustrating a vehicle structure 10 with a battery in the embodiment. FIG. 2 is a plan view illustrating the vehicle structure 10 with a battery. FIG. 3 is a bottom view illustrating a left side portion of the vehicle structure 10 with a battery.

As illustrated in FIGS. 1 to 3, a vehicle Ve includes, for example, the vehicle structure 10 with a battery in the rear of the vehicle Ve. Hereinafter, the vehicle structure 10 with a battery may be abbreviated as a "vehicle structure 10" in some cases.

The vehicle structure 10 includes left and right rear side frames (vehicle body side frames) 11 and 12, a front cross member 14, a rear cross member 15, a floor panel 16, a battery tray 18, and a battery unit (battery) 20.

<Rear Side Frame>

The left rear side frame 11 and the right rear side frame 12 are provided, in the rear of the vehicle, on outer sides in a vehicle width direction (that is, left and right outer sides) of a battery placement portion 31 which will be described later. The left rear side frame 11 and the right rear side frame 12 are, for example, skeleton members having high rigidity which constitute a part of a vehicle body skeleton by being formed in a hollow closed cross section.

The left rear side frame 11 is provided at a rear end portion 22a of a left side sill 22 and extends in a forward/rearward direction of the vehicle. The left rear side frame 11 includes a left inner sloped portion (inner sloped portion) 25 on a left outer side in the vehicle width direction of the battery placement portion 31. The left inner sloped portion 25 is provided, for example, between the front cross member 14 and the rear cross member 15 of the left rear side frame 11. To be specific, the left inner sloped portion 25, for example, slopes inward in the vehicle width direction from a portion 11a near the front cross member 14 of the left rear side frame 11 toward the rear cross member 15 (that is, the rear of the vehicle).

The right rear side frame 12 is provided at a rear end portion 23a of a right side sill 23 and extends in the forward/rearward direction of the vehicle. The right rear side frame 12 is formed generally bilaterally symmetrical with respect to the left rear side frame 11. Thus, the left rear side frame 11 will be described below and detailed description of the right rear side frame 12 will be omitted.

<Front Cross Member, Rear Cross Member>

The front cross member 14 spans a front end portion 11b of the left rear side frame 11 and a front end portion 12a of the right rear side frame 12. The front cross member 14 is placed in the front of the vehicle of the battery placement portion 31 which will be described later. The front cross member 14 is a skeleton member having high rigidity which extends in the vehicle width direction and constitutes a part of the vehicle body skeleton. The rear cross member 15 is disposed to have a space in the rear of the vehicle of the front cross member 14. The rear cross member 15 is disposed in the rear of the vehicle of the battery placement portion 31.

The rear cross member 15 spans the left inner sloped portion 25 of the left rear side frame 11 and a right inner sloped portion (inner sloped portion) 26 of the right rear side frame 12. The rear cross member 15 extends in a sloped shape on a left outer side in the vehicle width direction as a left cross sloped end portion 15a goes in a rearward direction of the vehicle. The rear cross member 15 extends in a sloped shape on a right outer side in the vehicle width direction as a right cross sloped end portion (not illustrated) goes in the rearward direction of the vehicle.

In the left cross sloped end portion 15a of the rear cross member 15, a left outer end portion (outer end portion) 15b on a left outer side in the vehicle width direction is joined to a rear end portion 25a of the left inner sloped portion 25. In other words, the left inner sloped portion 25 of the left rear side frame 11 is joined to a left outer end portion 15b of the rear cross member 15 on a left outer side in the vehicle width direction. Similarly, a right inner sloped portion 26 of the right rear side frame 12 is joined to a right outer end portion (not illustrated) of the rear cross member 15 on a right outer side in the vehicle width direction. The rear cross member 15 is a skeleton member having high rigidity which extends in the vehicle width direction and constitutes a part of the vehicle body skeleton.

<Floor Panel>

Figure 4:
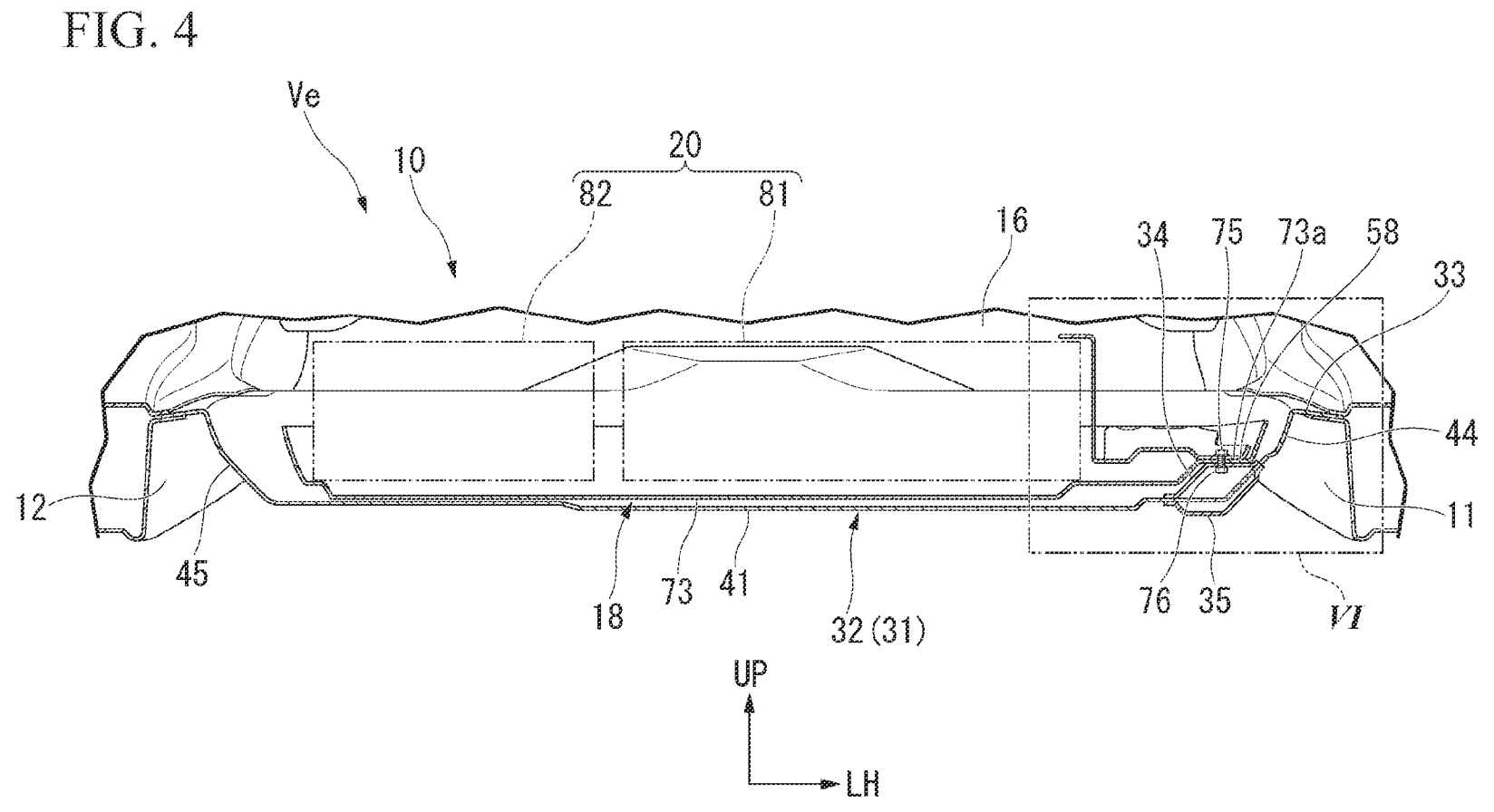

FIG. 4 is a cross-sectional view taken by cutting along line II-II of FIG. 1.

As illustrated in FIGS. 1, 2, and 4, the floor panel 16 is disposed between the left rear side frame 11 and the right rear side frame 12 and extends from the front cross member 14 in the rearward direction of the vehicle via the rear cross member 15. The battery placement portion (battery accommodation part) 31 is provided in the front of the floor panel 16. The battery placement portion 31 is disposed, for example, below a rear seat (seat: not illustrated). Although the rear seat is used as an example of the seat in the embodiment, the seat is not limited to the rear seat.

The battery unit 20 which will be described later is disposed above the battery placement portion 31. The battery unit 20 is located below the rear seat. The battery placement portion 31 includes a concave portion 32, a flange 33, a battery fixation portion 34, and a reinforcement patch 35. The concave portion 32 is disposed in a region surrounded by the front cross member 14, the rear cross member 15, the left rear side frame 11, and the right rear side frame 12. The concave portion 32 is formed to be concave downward in an upward/downward direction of the vehicle. The concave portion 32 is formed so that the battery unit 20 which will be described later can be accommodated.

The flange 33 is formed on an upper side of the concave portion 32. The flange 33 protrudes in a flange shape outward from the concave portion 32. The flange 33 is coupled to upper surface portions of the front cross member 14, the rear cross member 15, the left rear side frame 11, and the right rear side frame 12 from above. Thus, the battery placement portion 31 is supported by the front cross member 14, the rear cross member 15, the left rear side frame 11, and the right rear side frame 12.

The concave portion 32 includes a bottom portion 41, a front wall 42, a rear wall 43, a left side wall 44, and a right side wall 45. The bottom portion 41 is disposed below the battery unit 20, for example, horizontally. The front wall 42 rises upward from a front side of the bottom portion 41 and is joined to a front portion of the flange 33. The rear wall 43 rises upward from a rear side of the bottom portion 41 and is joined to a rear portion of the flange 33.

The left side wall 44 rises to slope upward from a left side of the bottom portion 41 toward a left outer side in the vehicle width direction and is joined to a left side portion of the flange 33. Hereinafter the left side wall 44 may be referred to as a "sloped portion 44" in some cases. The sloped portion 44 will be described in detail later.

The right side wall 45 rises to slope upward from a right side of the bottom portion 41 toward a right outer side in the vehicle width direction and is joined to a right side portion of the flange 33.

Figure 5:
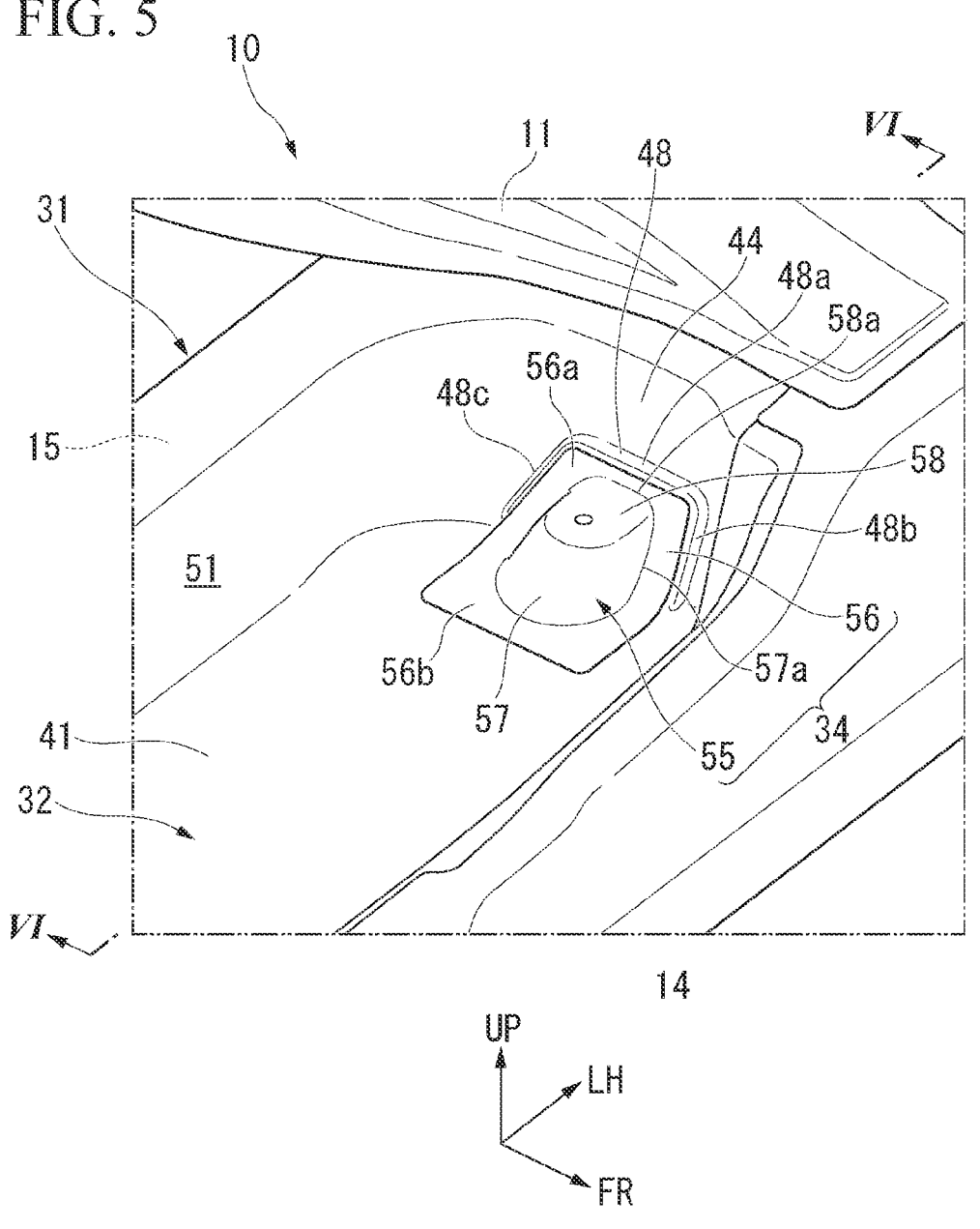
FIG. 5 is a perspective view illustrating a left side portion of a battery placement portion in the embodiment of the present invention.
Figure 6:
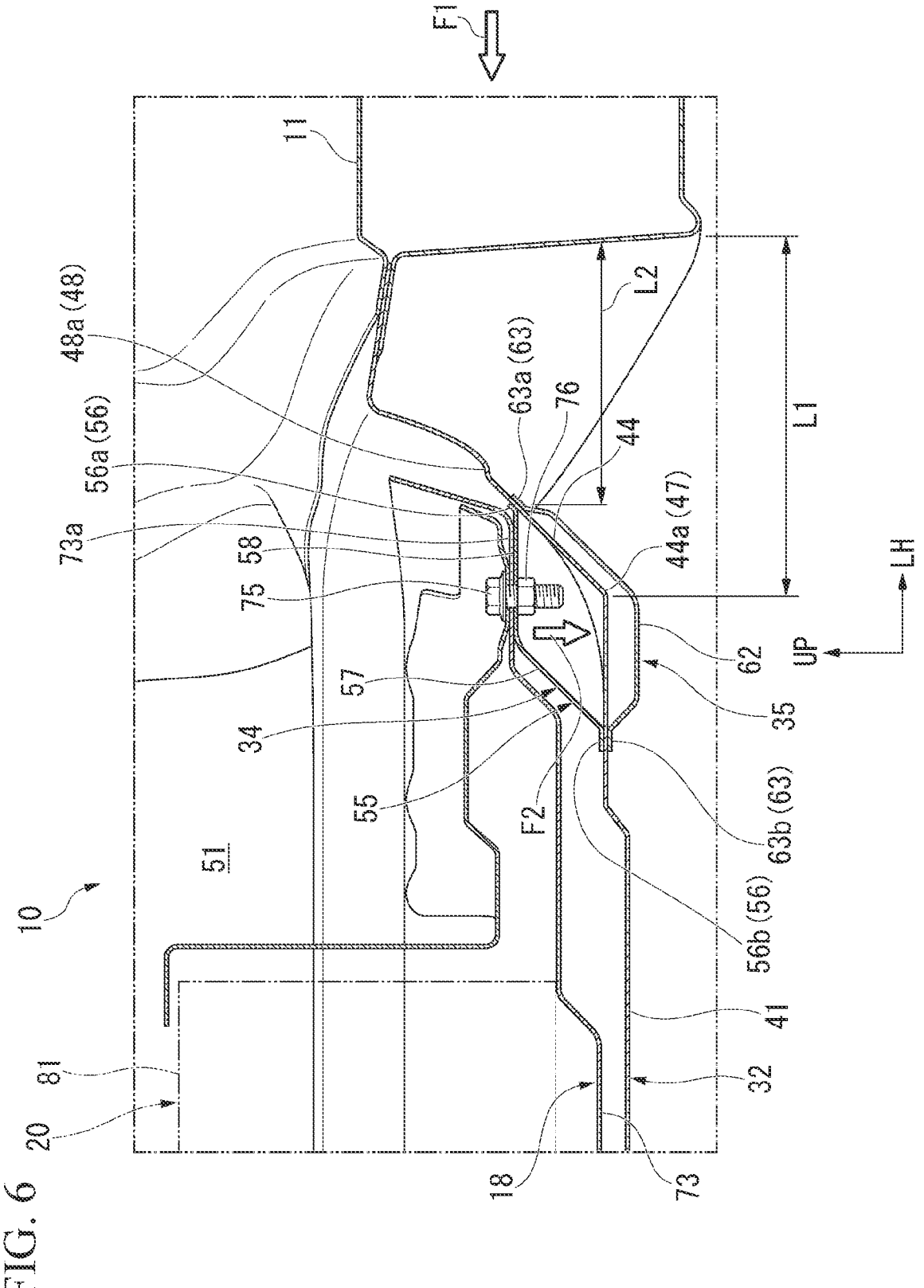
FIG. 6 is a cross-sectional view taken by cutting along line VI-VI of FIG. 5.

FIG. 5 is a perspective view illustrating a left side portion of the battery placement portion 31 in the embodiment. FIG. 6 is a cross-sectional view taken by cutting along line VI-VI of FIG. 5.

As illustrated in FIGS. 5 and 6, the sloped portion 44 is disposed to be spaced inward in the vehicle width direction with respect to the left rear side frame 11. To be specific, the sloped portion 44 is disposed to have a distance L1 in which a lower end portion 44a is relatively large inward in the vehicle width direction with respect to the left rear side frame 11.

Also, the sloped portion 44 includes a convex portion 48. The convex portion 48, for example, projects toward the concave portion 32 side (that is, vehicle interior 51 side) in a lower half portion of the sloped portion 44. In other words, the convex portion 48 is disposed on a left outer side in the vehicle width direction (that is, one side in the vehicle width direction) of the concave portion 32.

The convex portion 48 has, for example, an upper convex portion 48a, a front convex portion 48b, and a rear convex portion 48c.

The convex portion 48 has the front convex portion 48b which extends downward from a front end of the upper convex portion 48a and the rear convex portion 48c which extends downward from a rear end of the upper convex portion 48a. That is to say, the convex portion 48 is formed in an inverted U shape using the upper convex portion 48a, the front convex portion 48b, and the rear convex portion 48c.

The battery fixation portion 34 is coupled to the convex portion 48 from the inside of the concave portion 32. The battery fixation portion 34 has a placement portion 55 and a flange portion 56. The flange portion 56 has an outer half portion 56a which rises in a sloped shape and is coupled to the convex portion 48. The flange portion 56 has an outer circumference of the outer half portion 56a which is disposed along the upper convex portion 48a, the front convex portion 48b, and the rear convex portion 48c of the convex portion 48. Furthermore, the flange portion 56 has an inner half portion 56b which is formed horizontally and coupled to the bottom portion 41.

That is to say, the battery fixation portion 34 is provided inside the concave portion 32 by joining the flange portion 56 to the convex portion 48 and the bottom portion 41. In other words, the battery fixation portion 34 is provided at an end portion of an outer end portion on the left outer side in the vehicle width direction of the concave portion 32 (that is, outer side in the vehicle width direction, end portion on one side in the vehicle width direction).

The placement portion 55 is provided in a center of the flange portion 56. The placement portion 55 protuberates toward an inside of the concave portion 32 from the center of the flange portion 56 and is disposed to be spaced apart from the concave portion 32 (specifically, the bottom portion 41 and the sloped portion 44). That is to say, the battery fixation portion 34 is connected to the concave portion 32 from the inside to straddle an intersection portion 47 of the bottom portion 41 and the sloped portion 44.

The placement portion 55 has a leg portion 57 and a top portion 58. The leg portion 57 rises upward from the inner half portion 56b of the flange portion 56. The leg portion 57 is formed in a U shape in a plan view. A pair of outer ends 57a (outer ends 57a in the rear of the vehicle are illustrated in FIG. 2) in the leg portion 57 is joined to the outer half portion 56a of the flange portion 56. The top portion 58 is joined to an upper end of the leg portion 57. The top portion 58 has an outer end 58a which is joined to the outer half portion 56a of the flange portion 56. The top portion 58 is disposed horizontally so that the battery tray 18 which will be described later can be placed thereon.

The battery fixation portion 34 has the placement portion 55 which forms a hollow closed cross section (hollow cross section) together with the concave portion 32 (specifically, the bottom portion 41 and the sloped portion 44) by joining the flange portion 56 to the convex portion 48 and the bottom portion 41. Hereinafter, the hollow closed cross section may be referred to as a "first hollow closed cross section" in some cases.

As illustrated in FIGS. 3 and 6, the reinforcement patch 35 is coupled to the convex portion 48 from an outer side of the concave portion 32 (that is, outside of the vehicle interior 51). The reinforcement patch 35 is joined to the concave portion 32 from the outside of the vehicle interior 51 so that the reinforcement patch 35 and the battery fixation portion 34 overlap in a top view of the vehicle and thus is located on the outer side of the vehicle interior 51 in the concave portion 32. The reinforcement patch has a protrusion portion 62 and a patch flange portion 63.

The patch flange portion 63 is disposed in a state in which a patch outer half portion 63a rises in a sloped shape and the patch flange portion 63, the sloped portion 44, and the outer half portion 56a of the flange portion 56 overlap in an upward/downward direction. The patch outer half portion 63a is coupled to the sloped portion 44 and the outer half portion 56a of the flange portion 56 from the outside of the concave portion 32.

Also, the patch flange portion 63 is disposed in a state in which a patch inner half portion 63b is formed horizontally and the patch flange portion 63, the bottom portion 41, and the inner half portion 56b of the flange portion 56 overlap in the upward/downward direction.

The patch inner half portion 63b is coupled to the bottom portion 41 and the inner half portion 56b of the flange portion 56 from the outside of the concave portion 32. That is to say, the reinforcement patch 35 is coupled to the outer side of the concave portion 32 by joining the patch flange portion 63 to the convex portion 48 and the bottom portion 41 from the outside of the vehicle interior 51.

The protrusion portion 62 is provided in a center of the patch flange portion 63. The protrusion portion 62 protrudes downward from the center of the patch flange portion 63 and is disposed to be spaced apart from the concave portion 32 (specifically, the bottom portion 41 and the sloped portion 44). That is to say, the reinforcement patch 35 is connected to as a concave portion 32 from the outside of the vehicle interior 51 to straddle the intersection portion 47 of the bottom portion 41 and the sloped portion 44.

The reinforcement patch 35 has the protrusion portion 62 which forms a hollow closed cross section (hollow cross section) together with the concave portion 32 (specifically, the bottom portion 41 and the sloped portion 44) by joining the patch flange portion 63 to the convex portion 48 and the bottom portion 41 from the outside of the vehicle interior 51. Hereinafter, the hollow closed cross section may be referred to as a "second hollow closed cross section" in some cases.

The battery fixation portion 34 and the reinforcement patch 35 are disposed in the front of the vehicle with respect to the left inner sloped portion 25 of the left rear side frame 11. In addition, the battery fixation portion 34 and the reinforcement patch 35 are disposed on the further inward side in the vehicle width direction than the left outer end portion 15b of the rear cross member 15.

<Battery Tray, Battery Unit>

As illustrated in FIGS. 1, 4, and 6, the battery tray 18 is disposed above the bottom portion 41 in the concave portion 32. The battery tray 18 has a plurality of (two in the embodiment) front attachment portions 71 which are attached to the front cross member 14 from above. Furthermore, the battery tray 18 has a plurality of (three in the embodiment) rear attachment portions 72 which are attached to the rear cross member 15 from above.

In this state, the battery tray 18 has a tray bottom portion 73 which will be described later disposed between the battery unit 20 and the bottom portion 41 of the concave portion 32. The tray bottom portion 73 has a left end portion 73a which is placed on the top portion 58 of the battery fixation portion 34 from above. The tray bottom portion 73 has the left end portion 73a attached to the top portion 58 using fastening members (bolts 75 and nuts 76 in the embodiment).

The battery unit 20 is supported (loaded) by the tray bottom portion 73 while placed from above. The battery unit 20 includes a battery main body 81 composed of battery cells (not illustrated) and an electrical component 82 connected to the battery main body 81. That is to say, the battery main body 81 and the electrical component 82 are supported by the tray bottom portion 73. The tray bottom portion 73 is connected (fixed) to the battery fixation portion 34 using bolts 75 and the nuts 76 together with the battery main body 81 and the electrical component 82 (the battery unit 20). In other words, the battery unit 20 is connected to the battery fixation portion 34 via the tray bottom portion 73.

Here, the battery main body 81 is fixed while disposed on a left side in the vehicle width direction (one side in the vehicle width direction) of the tray bottom portion 73. That is to say, the battery main body 81 is disposed on the left side in vehicle width direction of the concave portion 32. Furthermore, the battery fixation portion 34 is disposed on a left outer side in the vehicle width direction of the concave portion 32. Thus, the battery main body 81 is disposed close to the battery fixation portion 34 side.

In addition, the electrical component 82 is fixed while disposed on the right side in the vehicle width direction (the other side in the vehicle width direction) of the tray bottom portion 73. That is to say, the electrical component 82 is disposed on the right side in the vehicle width direction of the concave portion 32.

The battery main body 81 and the electrical component 82 are located below the rear seat while supported by the tray bottom portion 73.

As described above, according to the vehicle structure 10 with a battery in the embodiment, the following functions and effects can be obtained.

That is to say, as illustrated in FIGS. 2 and 6, the concave portion 32 is disposed in a region surrounded by the front cross member 14, the rear cross member 15, the left rear side frame 11, and the right rear side frame 12. Furthermore, the battery unit 20 is disposed in the concave portion 32. Thus, for example, when an impact load F1 is input to the left rear side frame 11 due to side collision, the input impact load F1 can be prevented from being input to the battery unit 20 (particularly, the battery main body 81).

In addition, the battery unit 20 is placed on the battery tray 18 and the left end portion 73a of the battery tray 18 is attached to the top portion 58 of the battery fixation portion 34 using the bolts 75 and the nuts 76. Thus, the battery unit 20 is connected (fixed) to the concave portion 32 via the battery tray 18 and the battery fixation portion 34. Thus, the battery unit 20 can act as a mass for the concave portion 32. Therefore, it is possible to prevent the occurrence of abnormal noise due to the vibration of the concave portion 32 (that is, the battery placement portion 31) by preventing the vibration using the battery unit 20.

In this way, the battery unit 20 is connected (fixed) to the concave portion 32 via the battery tray 18 by disposing the concave portion 32 in the region surrounded by the front cross member 14, the rear cross member 15, the left rear side frame 11, and the right rear side frame 12. Thus, it is possible to prevent the impact load F1 from being input to the battery unit 20 without increasing a weight of the vehicle Ve (refer to FIG. 1) and it is possible to prevent the occurrence of abnormal noise due to the vibration.

The first hollow closed cross section is formed using the placement portion 55 of the battery fixation portion 34 and the concave portion 32 (specifically, the bottom portion 41 and the sloped portion 44) by joining the flange portion 56 of the battery fixation portion 34 to the convex portion 48 and the bottom portion 41. It is possible to increase the rigidity of the battery fixation portion 34. In addition, the reinforcement patch 35 is coupled to the concave portion 32 from the outside of the vehicle interior 51 so that the reinforcement patch 35 and the battery fixation portion 34 overlap. Thus, it is possible to further increase the rigidity of the battery fixation portion 34. Therefore, the battery unit 20 can be firmly supported by the battery fixation portion 34.

Moreover, it is possible to prevent the occurrence of abnormal noise due to the vibration by increasing the rigidity of the battery fixation portion 34 to prevent the vibration of the concave portion 32.

Also, the second hollow closed cross section is formed using the protrusion portion 62 of the reinforcement patch 35 and the concave portion 32 (specifically, the bottom portion 41 and the sloped portion 44). Thus, it is possible to increase the rigidity of the reinforcement patch 35. Thus, it is possible to further increase the rigidity of the battery fixation portion 34. Therefore, it is possible to firmly support the battery unit 20 using the battery fixation portion 34 and it is possible to prevent the occurrence of abnormal noise due to the vibration.

Furthermore, the battery fixation portion 34 is connected to the concave portion 32 from the inside to straddle the intersection portion 47 of the bottom portion 41 and the sloped portion 44 of the concave portion 32. In addition, the reinforcement patch 35 is connected to the concave portion 32 from the outside of the vehicle interior 51 to straddle the intersection portion 47. Thus, it is possible to increase the rigidity of the battery fixation portion 34. Therefore, it is possible to firmly support the battery unit (particularly, the battery main body 81) using the battery fixation portion 34.

Moreover, it is possible to prevent the occurrence of abnormal noise due to the vibration by increasing the rigidity of the battery fixation portion 34 to prevent the vibration of the concave portion 32.

As illustrated in FIGS. 5 and 6, the convex portion 48 is included in the sloped portion 44 and the battery fixation portion 34 and the reinforcement patch 35 are coupled to the convex portion 48. Thus, a load F2 of the battery unit (particularly, the battery main body 81) input via the battery fixation portion 34 can be smoothly transferred to the sloped portion 44 (that is, the concave portion 32) via the convex portion 48. Therefore, it is possible to increase the rigidity of the battery fixation portion 34 for the load F2 input from the battery unit 20.

Moreover, it is possible to prevent the occurrence of abnormal noise due to the vibration by increasing the rigidity of the battery fixation portion 34 to prevent the vibration of the concave portion 32.

Also, the lower end portion 44a of the sloped portion 44 is disposed to have a relative large distance L1 on the inside in the vehicle width direction with respect to the left rear side frame 11. The convex portion 48 is formed in the lower half portion of the sloped portion 44 and the battery fixation portion 34 is coupled to the convex portion 48. Thus, the battery fixation portion 34 can be disposed to have a relative large distance L2 on the inside in the vehicle width direction with respect to the left rear side frame 11.

Thus, it is possible to secure a clearance (space) for deforming the left rear side frame 11 using the impact load F1 input due to side collision. Therefore, it is possible to prevent the deformed left rear side frame 11 from coming into contact with the battery fixation portion 34 and the battery unit 20 and it is possible to prevent the impact load F1 from being input from the left rear side frame 11 to the battery unit 20.

As illustrated in FIGS. 2 and 3, the left inner sloped portion 25 of the left rear side frame 11 is joined to the left outer end portion 15b of the rear cross member 15. In addition, the battery fixation portion 34 and the reinforcement patch 35 are disposed on the forward side of the vehicle with respect to the left inner sloped portion 25 of the left rear side frame 11 and are disposed on the further inward side in the vehicle width direction than the left outer end portion 15b of the rear cross member 15. Thus, it is possible to efficiently transfer, as a load F3, a part of the impact load F1 input due to side collision to the rear cross member 15 via the left inner sloped portion 25 of the left rear side frame 11. Therefore, it is possible to prevent the impact load F1 from being input to the battery unit 20 (particularly, the battery main body 81) and the battery fixation portion 34.

As illustrated in FIGS. 2, 4, and 6, the battery tray 18 is connected (fixed) to the battery fixation portion 34 using the bolts 75 and the nuts 76 and the battery main body 81 and the electrical component 82 are supported by the battery tray 18. Thus, for example, the impact load F1 input due to side collision can be prevented from being input to the battery main body 81 and the electrical component 82 via the left rear side frame 11, the front cross member 14, and the rear cross member 15.

In addition, it is possible to increase a load (weight) F2 input to the battery fixation portion 34 by supporting the battery main body 81 and the electrical component 82 by the battery tray 18. Thus, it is possible to prevent the occurrence of abnormal noise due to the vibration by preventing the vibration of the concave portion 32.

Here, for example, when the battery main body 81 and the electrical component 82 are configured to be fastened and fixed only to the front cross member 14 and the rear cross member 15, for example, it is thought that a relative large load is input to the battery main body 81 and the electrical component 82 due to the torsion occurring in the vehicle body at the time of side collision or steering or road noise (that is, vibration due to friction between a tire and a road surface).

Thus, the battery tray 18 is connected to the battery fixation portion 34 included in the battery placement portion 31. The battery fixation portion 34 is disposed in a region surrounded by the front cross member 14, the rear cross member 15, and the left rear side frame 11. Therefore, for example, it is possible to prevent the distortion of the battery tray 18 due to the torsion occurring in the vehicle body at the time of side collision or steering or road noise. The battery main body 81 and the electrical component 82 are supported by the battery tray 18.

Thus, it is possible to prevent a load input to the battery main body 81 and the electrical component 82 (particularly, the battery main body 81) due to the torsion occurring in the vehicle body or road noise. Therefore, it is possible to suppress a load input to a bracket (not illustrated) or the like configured to connect the battery tray 18 and the battery main body 81 to be small and it is possible to increase the connection rigidity between the battery tray 18 and the battery main body 81.

Also, the battery main body 81 is disposed close to the battery fixation portion 34 side. Thus, the battery main body 81 which is heavier than the electrical component 82 can be efficiently supported by the battery fixation portion 34. Thus, it is possible to increase the support rigidity of the battery fixation portion 34 with respect to the battery unit 20.

In addition, the battery main body 81 can increase the role of mass for the concave portion 32 by supporting the battery main body 81 having a heavy weight using the battery fixation portion 34. Thus, it is possible to prevent the occurrence of abnormal noise due to the vibration by preventing the vibration of the concave portion 32 using the battery unit 20.

In addition, it is possible to further preferably prevent a load input to the battery main body 81 due to the torsion occurring in the vehicle body or road noise by disposing the battery main body 81 close to the battery fixation portion 34. Thus, it is possible to further suppress a load input to the bracket (not illustrated) or the like configured to connect the battery tray 18 and the battery main body 81 to be small.

The technical scope of the present invention is not limited to the above embodiment and various modifications can be provided without departing from the scope of the present invention.

Although, for example, an example in which the battery main body 81 is disposed on the left outer side in the vehicle width direction has been described in the above embodiment, the battery main body 81 may be disposed on the right outer side in the vehicle width direction.

In addition, it is possible to appropriately replace the constituent elements in the above embodiments with well-known constituent elements without departing from the gist of the present invention and the deformed examples described above may be combined as appropriate.

What is claimed is:

1. A vehicle structure with a battery, comprising:
a battery placement portion on which a battery is disposed and which is located below a seat;
a front cross member disposed at a vehicle forward position of the battery placement portion;
a rear cross member disposed at a vehicle rearward position of the battery placement portion;
a vehicle body side frame extending in a vehicle forward/rearward direction on an outer side in a vehicle width direction of the battery placement portion,
wherein the battery placement portion comprises:
a battery fixation portion that is provided on the outer side in the vehicle width direction and is connected to the battery,
a concave portion which is recessed downward so that the battery is able to be accommodated, and
a hollow cross section formed of the battery fixation portion and the concave portion; and
a reinforcement patch disposed on a vehicle room outside of the concave portion so that the reinforcement patch and the battery fixation portion overlap in a vehicle top view.

2. The vehicle structure with a battery according to claim 1,
wherein the concave portion is surrounded by the front cross member, the rear cross member, and the vehicle body side frame, and
wherein the battery fixation portion is disposed in the concave portion.

3. The vehicle structure with a battery according to claim 2,
wherein the concave portion comprises:
a bottom portion disposed below the battery, and
a sloped portion which slopes upward from the bottom portion toward an outside in the vehicle width direction, and wherein the battery fixation portion and the reinforcement patch are connected to the concave portion to straddle an intersection of the bottom portion and the sloped portion.

4. The vehicle structure with a battery according to claim 3,
wherein the sloped portion comprises a convex portion protruding toward an inside of the concave portion, and
wherein the battery fixation portion and the reinforcement patch are joined to the convex portion.

5. The vehicle structure with a battery according to claim 3, wherein the sloped portion is disposed to be spaced inward in the vehicle width direction with respect to the vehicle body side frame.

6. The vehicle structure with a battery according to claim 2,
wherein the vehicle body side frame comprises an inner sloped portion which slopes inward in the vehicle width direction toward a vehicle rearward direction and is joined to an outer end portion on an outer side in the vehicle width direction of the rear cross member, and
wherein the battery fixation portion and the reinforcement patch are disposed on a vehicle forward side with respect to the inner sloped portion and disposed on a further inward side in the vehicle width direction than the outer end portion of the rear cross member.

7. The vehicle structure with a battery according to claim 3, further comprising:
a battery tray disposed between the battery and the bottom portion and connected to the battery fixation portion,
wherein the battery comprises:
a battery main body constituted of a battery cell, and
an electrical component connected to the battery main body, and
wherein the battery tray supports the battery main body and the electrical component.

8. The vehicle structure with a battery according to claim 7,
wherein the battery main body is disposed on one side in the vehicle width direction of the concave portion,
wherein the electrical component is disposed on another side in the vehicle width direction of the concave portion, and
wherein the battery fixation portion is disposed on one end portion in the vehicle width direction of the concave portion.

* * * * *